No. 882,496. PATENTED MAR. 17, 1908.
G. G. FORESTER.
GASOLENE ENGINE AND PUMP DRAIN.
APPLICATION FILED JULY 6, 1907.
2 SHEETS—SHEET 2.
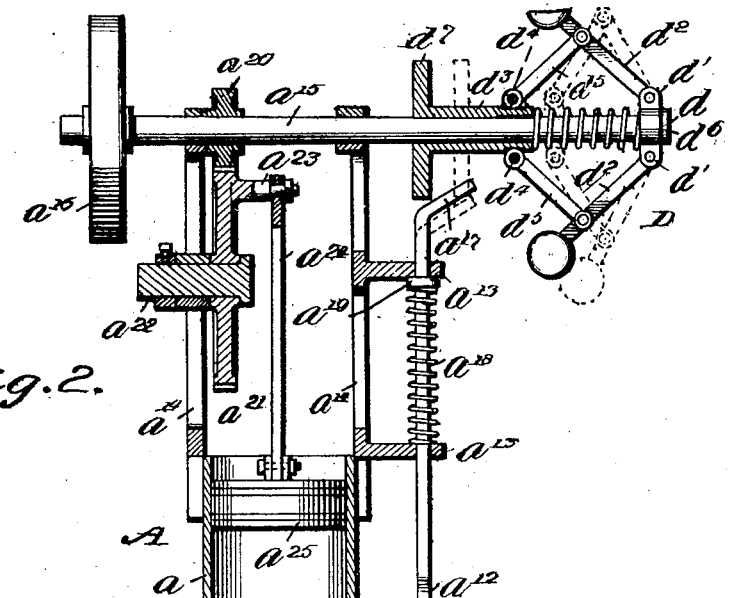
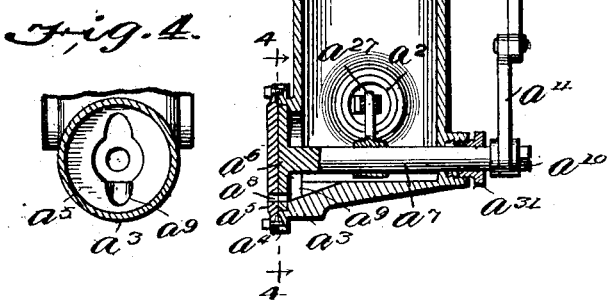
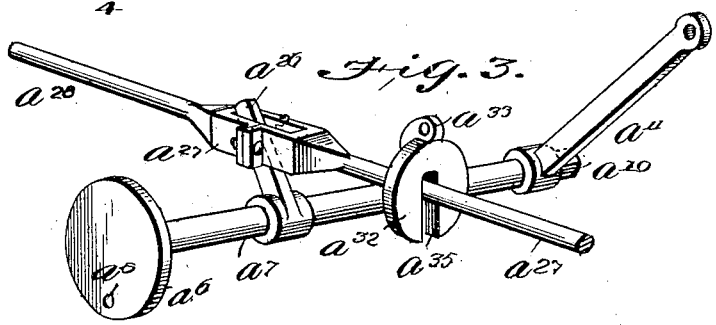
WITNESSES
F. C. Barry
C. A. Pettit
INVENTOR
GUSTAV G. FORESTER
BY Munn & Co.
ATTORNEYS
THE NORRIS PETERS CO., WASHINGTON, D. C.

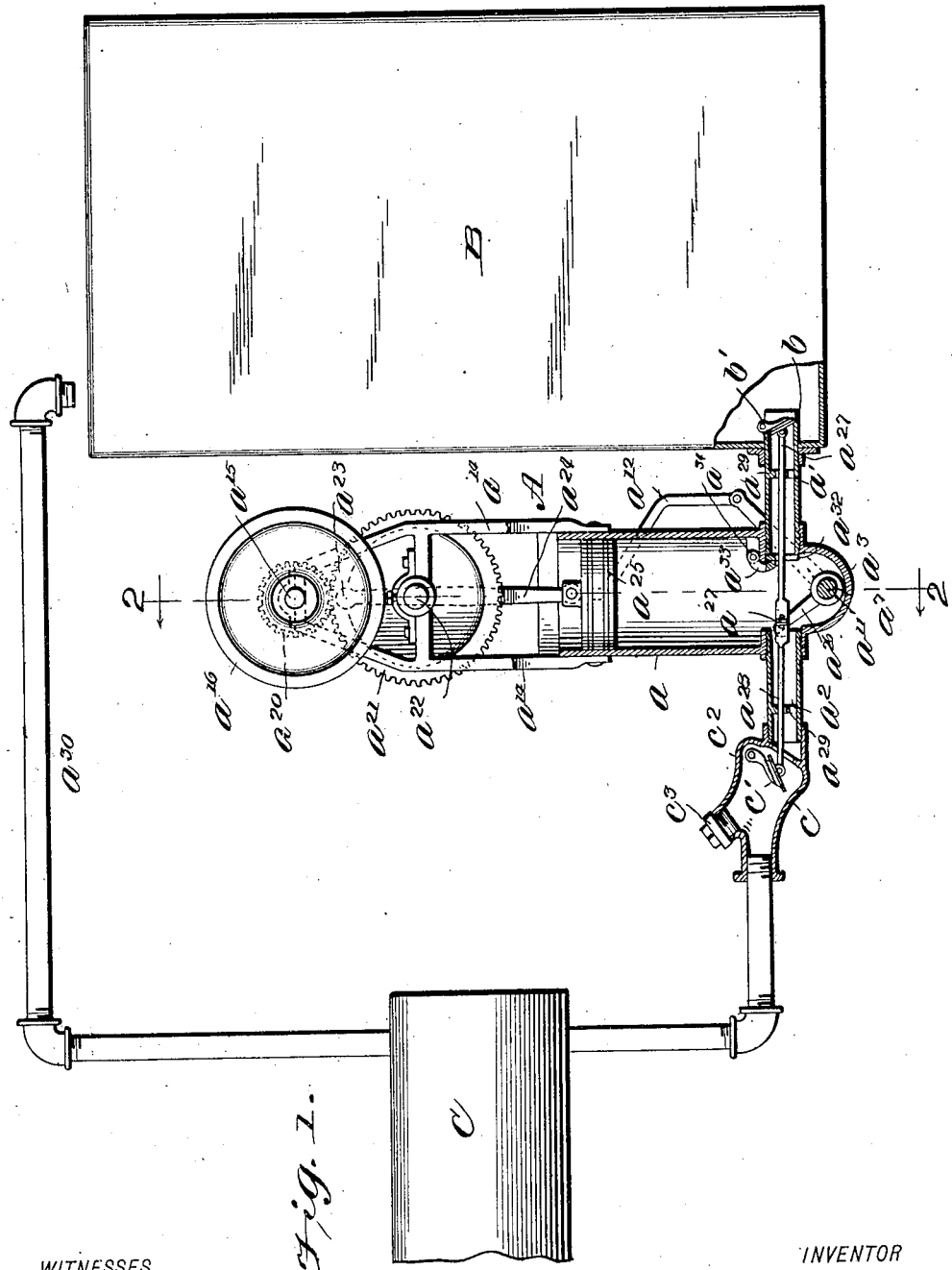

UNITED STATES PATENT OFFICE.

GUSTAV G. FORESTER, OF BAGLEY, IOWA.

GASOLENE ENGINE AND PUMP DRAIN.

No. 882,496.　　　Specification of Letters Patent.　　　Patented March 17, 1908.

Application filed July 6, 1907. Serial No. 382,509.

*To all whom it may concern:*

Be it known that I, GUSTAV G. FORESTER, a citizen of the United States, and resident of Bagley, in the county of Guthrie and State of Iowa, have invented an Improvement in Gasolene Engine and Pump Drains, of which the following is a specification.

My invention is an improvement in gasolene engine and pump drains, and consists in certain novel constructions and combinations of parts hereinafter described and claimed.

Referring to the drawings forming a part hereof, Figure 1 is a side elevation of my improvement partly in section. Fig. 2 is a section on the line 2—2 of Fig. 1. Fig. 3 is a detail of the draining valve and the mechanism connected therewith; and Fig. 4 is a section on the line 4—4 of Fig. 2.

In the present embodiment of my invention, the cylinder $a$ of the pump A is connected by a pipe $a'$ with the cooling tank B, and by a pipe $a^2$ with the engine cylinder C, and a valve casing $c$ is interposed in the length of the pipe $a^2$, a check valve $c'$ being arranged within the casing. The lower part of the cylinder is formed into a cylindrical chamber $a^3$, one of the ends $a^4$ of the chamber, being enlarged to form a circular valve seat $a^5$, upon which is seated a drainage valve $a^6$, the valve being secured to one end of a shaft $a^7$ journaled in the chamber $a^3$. The valve $a^6$ is disk-like in form, and is provided with an aperture $a^8$ therethrough, adapted to register with a slot $a^9$ in the valve seat, when the valve $a^6$ is in certain positions. The opposite end of the shaft $a^7$ is squared as at $a^{10}$ and secured thereon is an arm $a^{11}$ having pivotally connected to one end thereof a link $a^{12}$. The link $a^{12}$ is slidable longitudinally of the cylinder $a$, being mounted in bearings $a^{13}$ on one of a pair of brackets $a^{14}$ arising from the cylinder, and having journaled in the free end thereof a shaft $a^{15}$. One end of the shaft $a^{15}$ is provided with a pulley $a^{16}$, and the other end is provided with a governor D, comprising a collar $d$ fixed to the end of the shaft and provided with oppositely projecting lugs $d'$ to which are pivotally connected weighted levers $d^2$. A sleeve $d^3$ is slidably mounted upon the shaft and the said sleeve is also provided with oppositely projecting lugs $d^4$, and levers $d^5$ are pivotally connected with lugs $d^4$ and with the weighted levers $d^2$ near the outer ends thereof. A spring $d^6$ is arranged between the collars, and the collar $d^3$ is provided with a disk $d^7$ for engaging the upper end $a^{17}$ of the link $a^{12}$, when the governor is in certain positions, the said upper end of the link being arranged at an angle to the main portion and cam-shaped as shown in Fig. 2. A spring $a^{18}$ is arranged between a collar $a^{19}$ secured to the link, and one of the bearings $a^{13}$ before described, for normally maintaining the link in its uppermost position. A pinion $a^{20}$ is secured to the shaft $a^{15}$, and meshes with a gear wheel $a^{21}$ journaled on a stud shaft $a^{22}$ connected with one of the brackets $a^{14}$, and the gear wheel $a^{21}$ is provided with a wrist pin $a^{23}$ connected by a link $a^{24}$ with the piston $a^{25}$ of the pump.

It will be evident from the description, that when the pump is in motion, the rotation of the shaft will tend to move the weighted levers $d^2$ outwardly, owing to centrifugal force. When the centrifugal force attains a certain point, the movement of the weighted levers will move the sleeve $d^3$ to bring the disk into contact with the angular portion of the link, whereby to move said link downward, and to rotate the disk valve $a^6$. This valve is so arranged that the aperture $a^8$ in the valve will register with the slot $a^9$ in the seat when the pump is at rest, that is, when the link $a^{12}$ is in its uppermost position. The shaft $a^7$ before mentioned, is provided within the chamber $a^3$ with an arm $a^{26}$, and to the free end of the arm are pivotally connected links $a^{27}$, $a^{28}$, one of the links $a^{27}$ projecting towards the cooling tank, and the other, $a^{28}$, projecting towards the engine cylinder. The links $a^{27}$, $a^{28}$, are slidable through bearings in spiders $a^{29}$, secured within the pipes $a'$, $a^2$, and are adapted to engage with their free ends the check valve $c'$ before mentioned, and a check valve $b$ within the cooling tank. The valves $b$, $c'$ are supported by arms $b'$, $c^2$, pivoted to the free end of the pipe $a'$, and to the inner face of the casing $c$, respectively. When the pump is at rest, and the drainage valve open, the check valve $c'$ will also be open, and the valve $b$ will be closed, since the links $a^{27}$, $a^{28}$, will both be moved in the direction of the engine cylinder.

When the pump is in operation, and the link $a^{12}$ is depressed, whereby to rotate the shaft $a^7$ and close the disk valve, the check valve $c'$ will be closed, and the valve $b$ will be opened, thus permitting the passage of fluid from the cooling tank to the pump, and from thence to the engine cylinder, from which a pipe $a^{30}$ discharges into the cooling tank. When the pump is stopped, the drainage valve and the check valve in the pipe leading to the engine cylinder will be opened, and the valve in the pipe leading to the cooling tank will be closed, thus permitting a free drainage of the engine cylinder and the pump.

Where the shaft $a^7$ passes through the end wall of the circular chamber $a^3$, a stuffing box $a^{31}$ is arranged, and the valve casing $c$ is provided with a screw cap $c^3$ whereby access may be obtained to the casing. A check valve $a^{32}$ is provided at the opening of the pipe $a'$ into the cylinder $a$ to prevent back flow of the fluid from the cylinder to the cooling tank on the downward motion of the piston. The valve $a^{32}$ is secured to an arm $a^{33}$ which is pivoted as at $a^{34}$ to the pipe, and the valve is slotted as at $a^{35}$ to permit the passage of the link $a^{27}$.

I claim:

1. The combination with the engine cylinder and the cooling tank, of a pump comprising a cylinder, the bottom of said cylinder being formed into a horizontal cylindrical chamber, one end of the chamber having its exterior formed into a valve seat, said seat being provided with a slot leading into the cylinder, a shaft journaled in the cylindrical chamber and provided on one of its ends with a disk valve resting on the valve seat, an arm on the other end of the shaft, brackets connected with the opposite end of the cylinder, and a shaft journaled in the brackets, and provided on one of its ends with a governor, one of said brackets being provided with bearings, a link connected with the arm of the shaft and slidable through the bearings, the upper end of said link having an inclined portion, a governor on the end of the shaft, a sleeve slidable on the shaft and moved by the governor, said sleeve having a disk for engaging the inclined portion of the link, a piston in the pump, means whereby said shaft may drive the piston, a pipe leading from the cylinder to the cooling tank, a pipe leading from the cylinder to the engine cylinder, a check valve in each of said pipes, one of said checks opening toward the cooling tank, and the other towards the engine cylinder, said shaft in the cylindrical chamber being provided with an arm, links connected with the arm and adapted for engaging the check valves when the shaft is rotated, and a check valve between the cooling tank and the cylinder, said check valve opening towards the cylinder, said disk valve being provided with a perforation adapted to register with the slot of the valve seat when the pump is in an inoperative position.

2. The combination with the engine cylinder and the cooling tank, of a pump arranged therebetween, and communicating with said cylinder and cooling tank, a check valve between the pump and the cooling tank, a check valve between the pump and the engine cylinder, a normally open drainage valve in connection with the pump, a governor in connection with the pump, means whereby the movement of the pump will actuate said governor to close the drainage valve, and means whereby the closure of the drainage valve will open the check valve between the pump and the cooling tank, and will close the check valve between the engine cylinder and the pump.

3. The combination with the engine cylinder and the cooling tank, of a pump arranged therebetween and communicating with the cylinder and with the tank, a normally open drainage valve in connection with the pump, a normally open check valve between the pump and the engine cylinder, a check valve between the pump and the cooling tank, a second check valve within the cooling tank for closing the communication between the said tank and the pump, means whereby the starting of the pump will close the drainage valve, and means whereby the closure of the drainage valve will close the check valve between the pump and the engine cylinder, and will open the check valve within the cooling tank.

4. The combination with the engine cylinder and the cooling tank, of a pump arranged therebetween, and communicating with the cylinder and with the tank, a normally open drainage valve in connection with the pump, a normally closed check valve between the pump and the cooling tank, a second normally closed check valve within the cooling tank for closing communication between the tank and the pump, means whereby the starting of the pump will close the drainage valve, and means whereby the closure of the drainage valve will open the said second check valve.

5. The combination with the engine cylinder and the cooling tank, of a pump arranged therebetween and communicating with said cylinder and cooling tank, a check valve between the pump and the cooling tank, a check valve between the pump and the engine cylinder, a normally open drainage valve in connection with the pump, means whereby the starting of the pump will close the drainage valve, and means whereby the closing of the drainage valve will open the check valve between the pump and the cooling tank.

6. The combination with the engine cylinder and the cooling tank, of a pump arranged therebetween and communicating with said cylinder and cooling tank, a normally open drainage valve in connection with the pump, a check valve for preventing movement of the fluid from the pump to the cooling tank, a check valve for preventing movement of fluid from the cooling tank to the pump, means whereby the movement of the pump will close the drainage valve and will open the last named check valve.

GUSTAV G. FORESTER.

Witnesses:
 CHAS. W. CAIN,
 A. H. BUSCH.